Jan. 23, 1968    YASUSABURO KOBORI ETAL    3,364,878
APPARATUS FOR MAKING SANDWICHES

Filed Dec. 17, 1965                                            17 Sheets-Sheet 4

Fig. 4.

Jan. 23, 1968  YASUSABURO KOBORI ET AL  3,364,878
APPARATUS FOR MAKING SANDWICHES
Filed Dec. 17, 1965  17 Sheets-Sheet 16

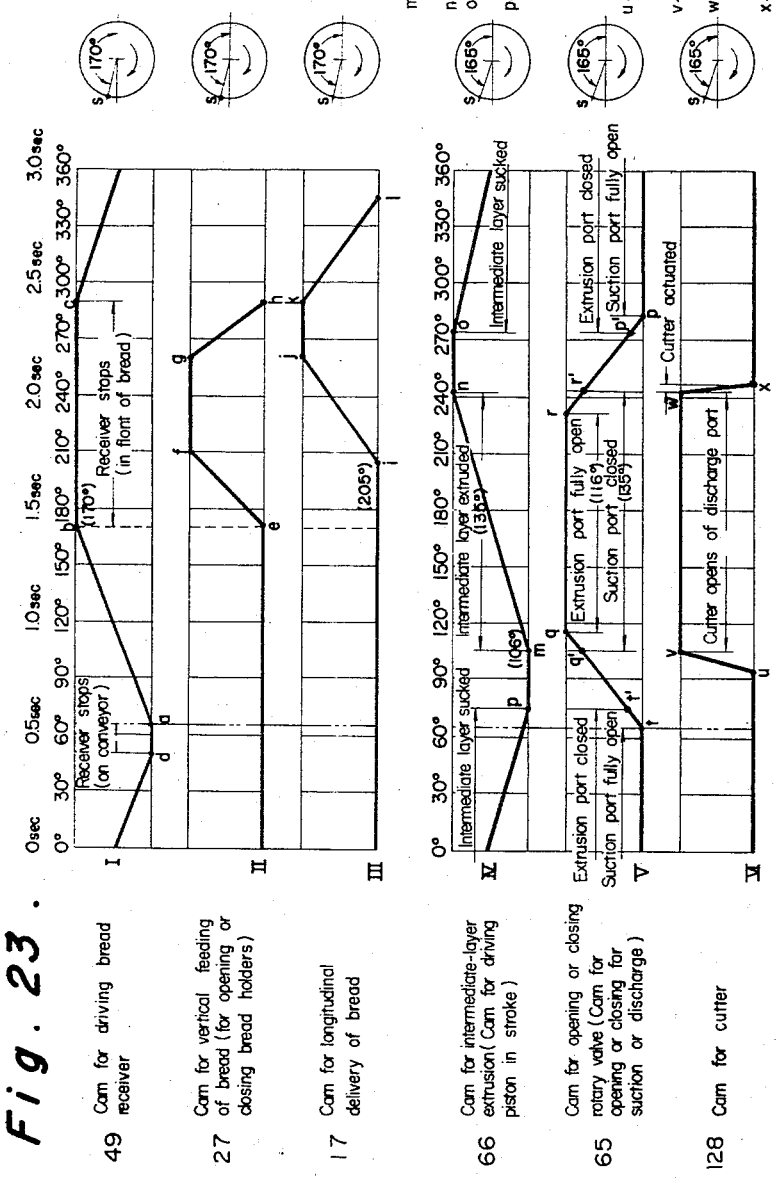

3,364,878
APPARATUS FOR MAKING SANDWICHES
Yasusaburo Kobori, Tokyo, and Kojiro Kikuta, Nagoya, Japan; said Kikuta assignor to Mitsubishi Jukogyo Kabushiki Kaisha, Tokyo, Japan
Filed Dec. 17, 1965, Ser. No. 514,534
7 Claims. (Cl. 107—1)

ABSTRACT OF THE DISCLOSURE

Apparatus for making sandwiches in which slices of bread are fed intermittently onto a conveyor from one side thereof and a layer of material is fed onto the slices of bread by material feeding means located downstream of the bread feeding means and operated in synchronized manner therewith.

---

This invention relates to apparatus for making sandwiches, wherein slices of bread of a predetermnied thickness are fed one by one at regular intervals on a main conveyor which travels on a main frame. A filling or intermediate material, such as butter, cheese, meat, jam, eggs, vegetable spreads, various pastes, or the like, is spread in a predetermined thickness on the upper surface of the advancing slices of bread, and thereafter other slices of bread of a predetermined thickness are fed at regular intervals to be placed over the intermediate material thus spread on the first slices of bread so as to form sandwiches automatically.

The present invention has as an object to provide apparatus and methods for making sandwiches.

The apparatus according to the invention comprises a conveyor which travels on said main frame, a first bread feeding unit disposed alongside the travelling path of said conveyor for feeding first slices of bread at regular intervals onto said conveyor, an intermediate material feeding unit for feeding and spreading filling materials such as butter, cheese, jam, meat, egg, vegetable spreads, various pastes, or the like onto the slices of bread carried by said conveyor, and a second bread feeding unit for placing second slices of bread on said first slices of bread which have been spread with the intermediate material, thereby forming sandwiches.

By the construction as above-described, the apparatus according to the invention is very compact in design, and can make sandwiches automatically and continuously with no need of manual labor, because it is only necessary to supply required amounts of bread to said first and second bread feeding units and filling material to the intermediate material feeding unit. Consequently, sandwiches can be produced with very high efficiency and at low cost.

It is another object of the invention to provide apparatus for making sandwiches having bread feeding units each of which comprises a pair of bread guide members disposed opposite each other on a supporting frame on a side of the main frame, a bread delivery mechanism located on a delivery end of said guide members and engaging slice by slice the bread delivered by said guide pieces to place the same on said conveyor, and means for actuating said delivery mechanism intermittently, whereby the intermittent motion of the bread delivery mechanism permits the bread to be fed and placed, slice by slice, at regular intervals onto the conveyor.

Because of the above construction, slices of bread can be fed intermittently and automatically without need of manual labor except for the supply of bread slices between the pair of bread delivery guide pieces. Thus, bread slices can be fed smoothly and efficiently.

According to the invention, the intermediate material feeding unit comprises a container for accommodating filling material such as butter, cheese, meat, egg, vegetable spread, jelly, various pastes or the like, said container being disposed above the main frame and having at the bottom thereof a discharge port for discharging the filling or intermediate material, feeding means located at the bottom of said container for feeding the intermediate material in the container to the upper face of the first slices of bread when the latter pass below said discharge port, and actuating means for actuating said feeding means synchronously with the movement of said slices of bread, thereby enabling automatically the feeding and spreading of the material on the bread carried on the conveyor, whereby the feeding unit operates automatically and it is only necessary to supply a sufficient amount of filling material to said container.

In further accordance with the invention, the above feeding unit comprises a cylinder member having an intake and discharge port, actuating means for actuating said member, a piston member inserted in said cylinder member and control means for operating said piston member, said piston member being moved reciprocatingly within said cylinder member by means of said control means. Thus, by the connection of the piston member to said control means, the intermediate material is sucked from the container into the cylinder member through said intake and discharge port and then is extruded onto the slices of bread, thereby enabling to keep the amount, i.e., the thickness, of the intermediate material fed on the sliced bread constant, while, moreover, enabling control of the amount to be extruded as desired by adjusting the stroke of said piston member.

Furthermore, the feeding unit is provided with an intermediate material discharge outlet having a cutter which slides perpendicularly to the direction of extrusion of the intermediate material, said discharge outlet being disposed at the lower part of the said cylinder means and being provided with cutter operating means, one end of which is connected to said cutter and the other end to the driving source of the said piston means operation mechanism, the structural arrangement being such as to permit the said cutter operating means to work in accordance with the bread transfer and the reciprocation of the said piston means. Thus, as described above, intermediate material in the container is sucked into the cylinder in a predetermined amount each rearward stroke of the piston member and discharged through the discharge outlet for each forward stroke of the piston means. Since the discharge outlet is closed and opened by the cutter, whose operation is controlled by the cutter operating means which operates in correspondence with the movement of the piston means and the bread transfer, the outflow of intermediate material from the discharge outlet is cut. It is thus possible to control the fed amount of intermediate material applied to the bread and to apply said material accurately to the desired place on the bread as a result of the operation of the piston means and the cutter. Consequently, the present invention has the above-mentioned and other excellent practical advantages.

The present invention will be described in greater detail with reference to the accompanying drawing showing an embodiment of the invention which is adapted for the manufacture of sandwiches composed of two slices of bread one upon the other with an intermediate layer of filling material spread therebetween.

In the drawing:

FIGURE 4 is an enlarged side view of a bread feeding unit of the sandwich-making machine;

FIGURE 23 is a diagrammatic showing of the timing relation in one cycle of the component parts of the machine according to the invention.

Figure 9:
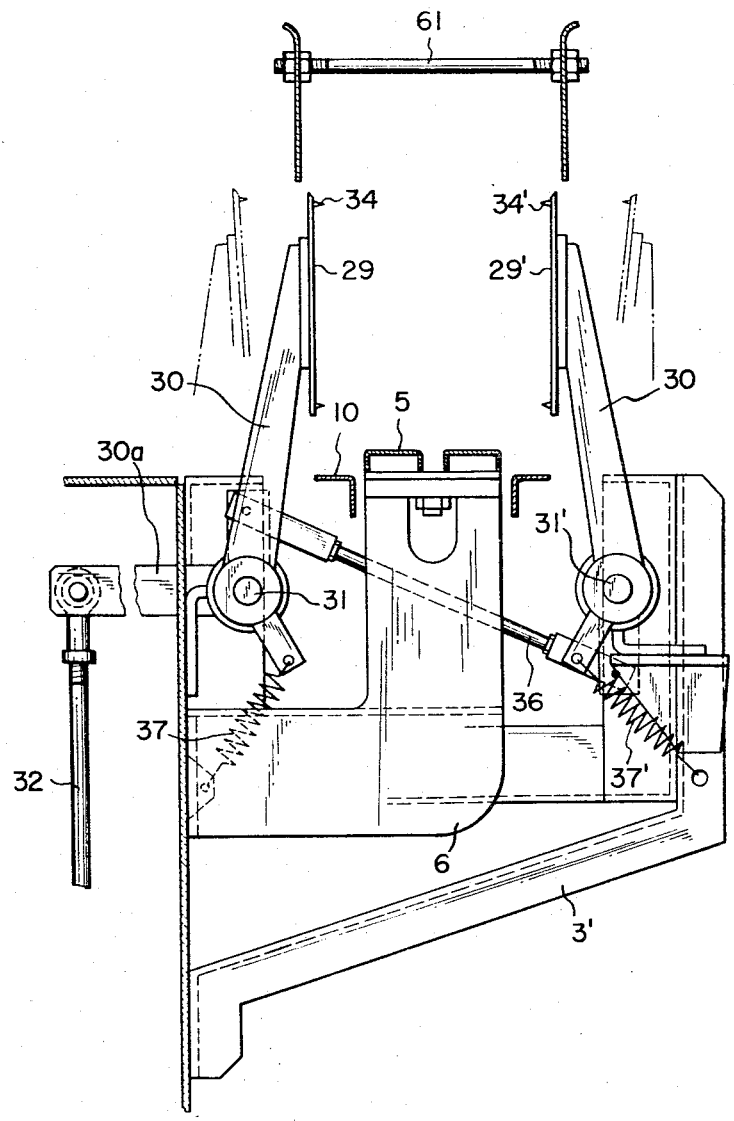
FIGURE 9 is a front view, in vertical section, of bread holders taken along the line D—D of FIG. 4.
Figure 10:
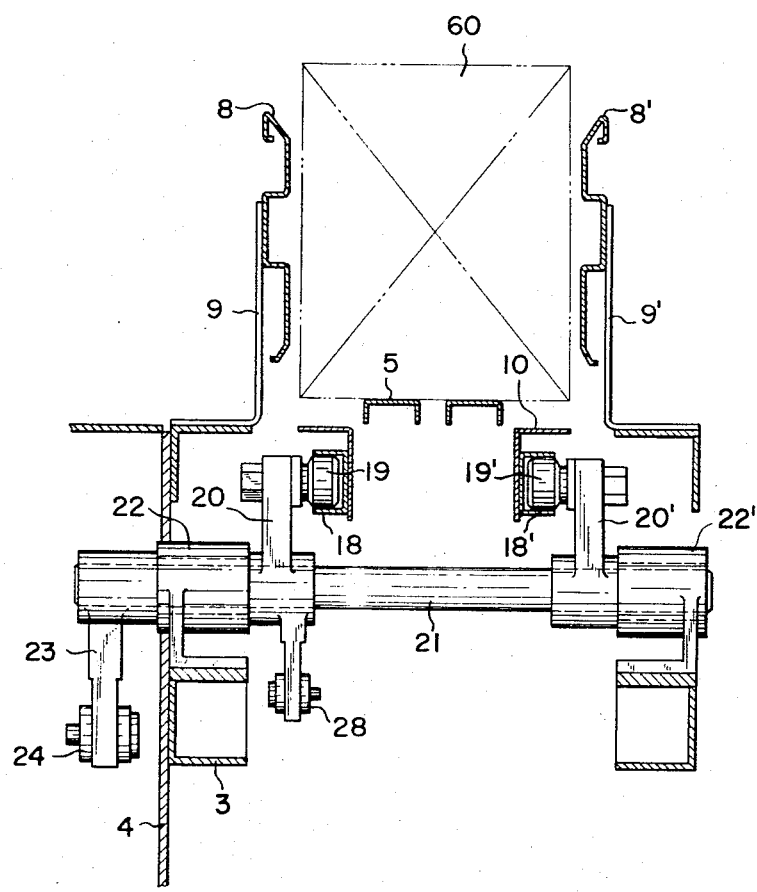
FIGURE 10 is a front view, in vertical section of the bread feeding unit taken along the line E—E of FIG. 4.

The sandwich machine according to the invention comprises a main conveyor frame 1, a first bread feeding unit A, an intermediate material feeding unit B, a second bread feeding unit A', a cutting unit C which trims and cuts sandwiches to a suitable width, and a wrapping unit D, all arranged at suitable intervals along the length of frame 1. Extending at right angles to the main conveyor frame 1 are supporting frames 3 for the bread feeding units. In each unit, the supporting frames 3 are held in position by brackets 3' and 3" on one side of a respective cam box 4. Fixed beds 5 located above the center of said supporting frames 4 are supported by supporting bars 6 and 7 at the front and rear ends of the bread units at respective locations above the cam box 4 and supporting frames 3, as illustrated in FIGS. 4 and 9. Side plates 8 and 8' for guiding bread slices are supported by supporting strips 9 and 9' respectively, which are secured to both sides of the supporting frames 3, as shown in FIG. 10.

Figure 5:
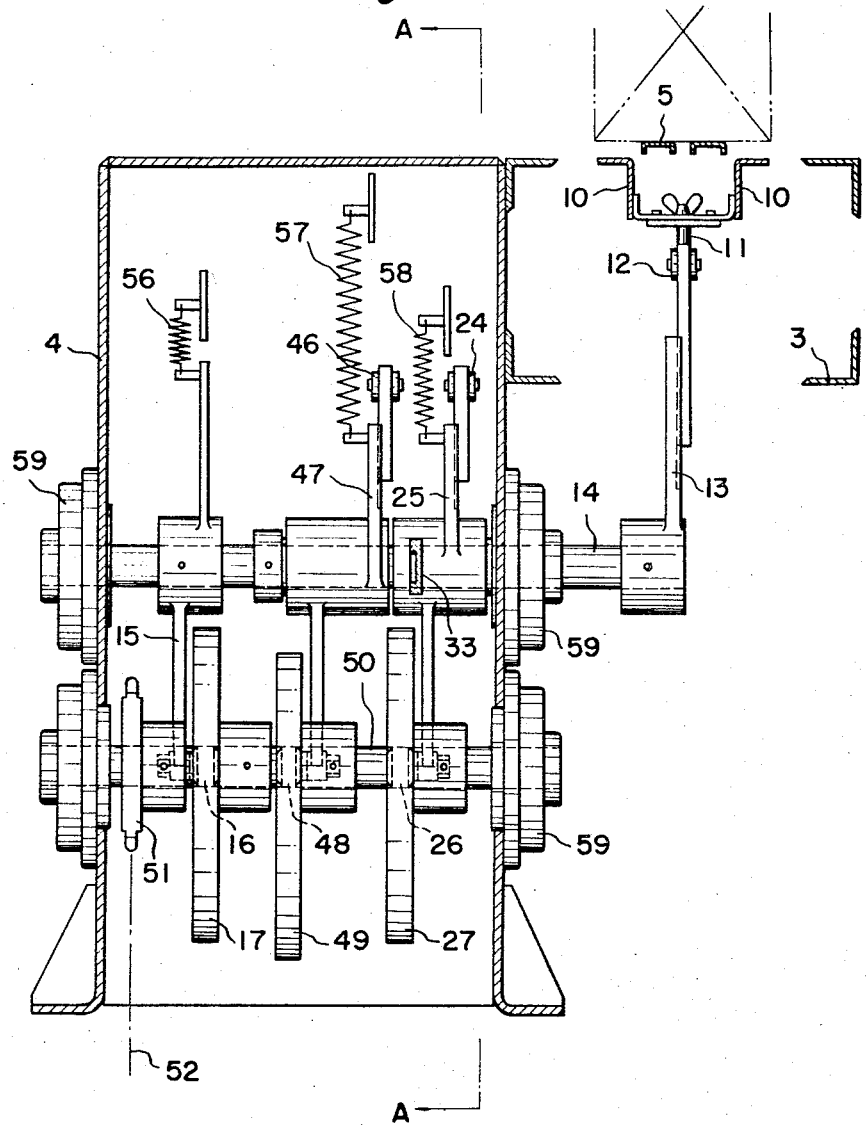
FIGURE 5 is a front view, in vertical section, of the inside of the cam box of FIG. 4.

As seen in FIGS. 4 and 5, movable beds 10 for feeding bread, are supported on both sides of the fixed beds 5, by means of a supporting rod 11, which is in turn connected through a connecting rod 12 to a lever 13 which holds said connecting rod 12 slidably thereon. The lever 13 is fixedly secured to a shaft 14. Also fixed to the shaft 14 is a bell crank 15, which rotatably supports a cam follower 16 on one end, so that the revolution of a cam 17 can be communicated to the bell crank 15 and the lever 13, which in turn urges, through the connecting rod 12 and supporting rod 11, the movable beds 10 to move back and forth. On the outer sides of movable beds 10 are guide rails 18 and 18', and inside the rails are slidably supported rolls 19 and 19' (FIG. 10) which are rotatably fitted on levers 20 and 20' respectively. The levers 20 and 20' are attached to a supporting shaft 21 which is rotatably supported in bearings 22, fitted to frames 3. At one end of the shaft a lever 23 is secured, which is fitted in one end of a bell crank 25 through a connecting rod 24. The bell crank 25 is rotatably fitted on the shaft 14 and is provided with a cam follower 26 on one end, such that the revolution of a cam 27 can be transmitted through the bell crank 25, connecting rod 24, and lever 20, thereby to cause upward and downward movement of the movable beds 10. The other end of lever 20 is connected at the rear of said frames 3 by a link 28.

Figure 6:
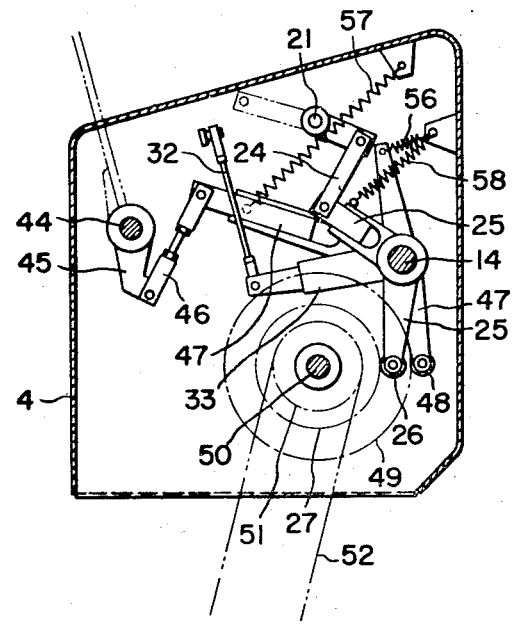
FIGURE 6 is a side view, in vertical section, taken along the line A—A of FIG. 5.

Bread holder plates 29 and 29' adjacent to cut-away portions at the front ends of side plates 8 and 8' are, as shown in FIG. 9 attached to the front ends of levers 30 and 30', which are rotatably pivoted on pins 31 and 31' respectively, and are connected with each other by a connecting rod 36. One lever 30 is provided with a protrusion 30a, which extends into the cam box 4 and is operably connected at its end with a lever 33 intergral with said bell crank 25 through a connecting rod 32 (FIG. 6). Thus, the revolutionary movement of the cam 27 is converted by the bell crank 25, lever 33, connecting rod 32, and lever 30, into lateral or opening and closing motions of the bread holder plates 29 and 29'.

On the inner side of bread holder plates 29, 29' are provided sharp pawls 34, 34', to prevent the rows of bread slices from falling down. With such arrangement, bread slices which are not strictly uniform in dimensions are held in position with a slight pressure. Tension springs 37 and 37' are provided to pull back the bread holder plates after each delivery of a bread slice.

Figure 7:
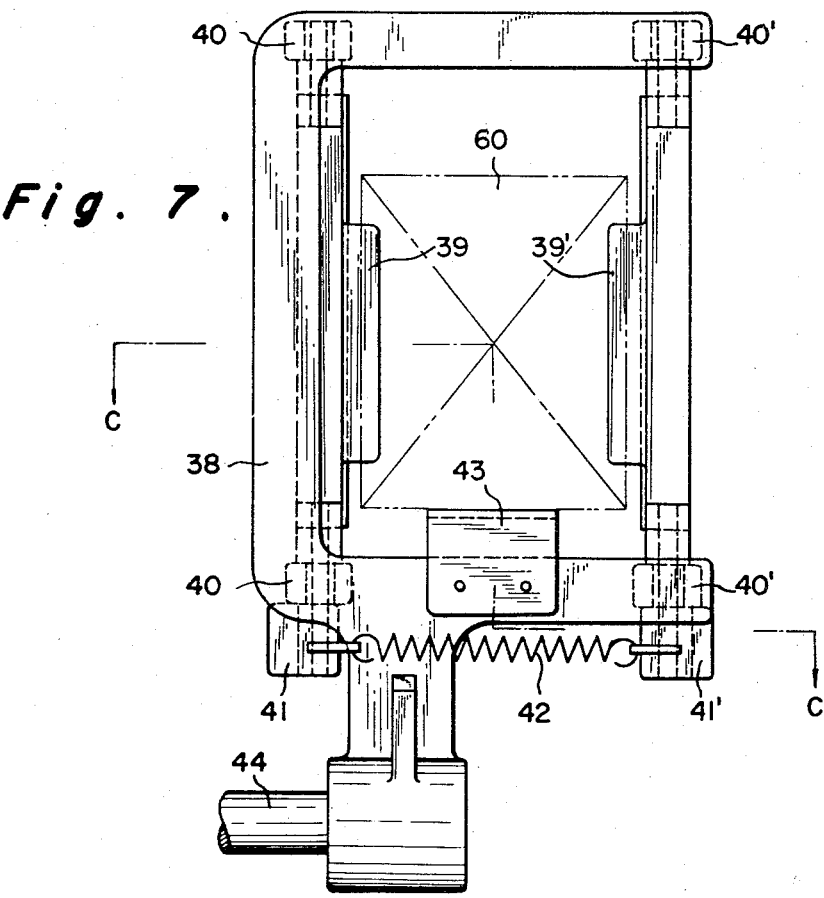
FIGURE 7 is a front view of a bread receiver taken along the line B—B of FIG. 4.

A bread receiver 38 is positioned ahead of the bed 5 and the side plates 8 and 8', said bread receiver being swingably pivoted on a shaft 44 disposed inside the cam box 4 (see FIGS. 4 and 7). On both sides of the bread receiver 38 are disposed receiving extensions 39 and 39', which are rotatably journaled in bearings 40 and 40' respectively. Below the extension, levers 41 and 41' are provided which are urged inwardly with respect to each other by means of a tension spring 42, so that the inner edges of said extensions can be aligned symmetrically with respect to each other. The bottom of each bread slice is received by a receiver plate 43.

On the shaft 44 is mounted a lever 45, the end of which is connected, as shown in FIGS. 5 and 6, with a link member 46 to a lever 47 fitted on the shaft 14. The other end of lever 47 is in contact with a cam 49 through a cam follower 48. The rotational movement of cam 49 is transmitted through the lever 47, link member 46 and lever 45, to cause the bread receiver to undergo rotation, i.e. an upward and downward circular reciprocating motion, intermittently between the bread-holding position in front of said side plates 18 and 18' and a horizontal position immediately above the conveyor 1' which travels on the main frame 1.

The cams 17, 27 and 49 are secured to an actuating shaft 50 which is connected to a main motor through a chain wheel 51 on said shaft, a chain 52, and a chain wheel 53 on the main shaft 2.

Figure 11:
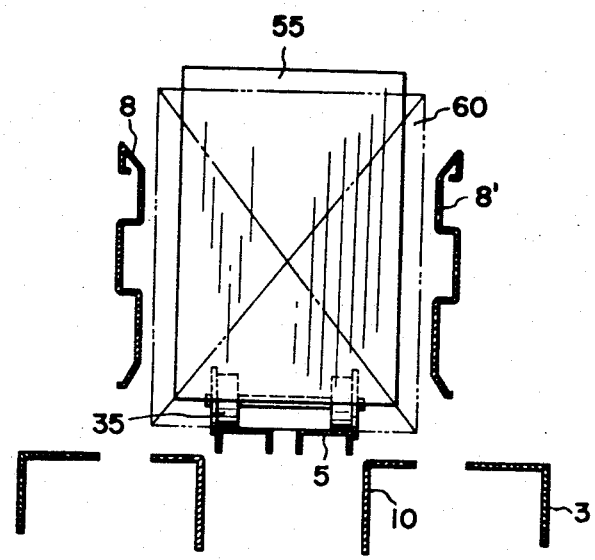
FIGURE 11 is a sectional view of the bread pusher taken along the line F—F in FIG. 4.

Numeral 54 (FIG. 4) designates a rod for pushing up the bread receiving extension 39, 39'. Numeral 55 is a bread pusher truck which applies force to the bread in the feeding unit (FIGS. 4 and 11). A holding rod 61, secures the side guide plates 8, 8' together (FIG. 9). Numerals 56, 57 and 58 represent tension springs for bringing the operating levers back to the rest positions shown in FIGS. 5 and 6. The actuating shaft 50, lever shaft 14, and receiver supporting shaft 44 of each bread feeding unit are each rotatably supported in the cam box 4 by respective bearings 59.

Figure 1:
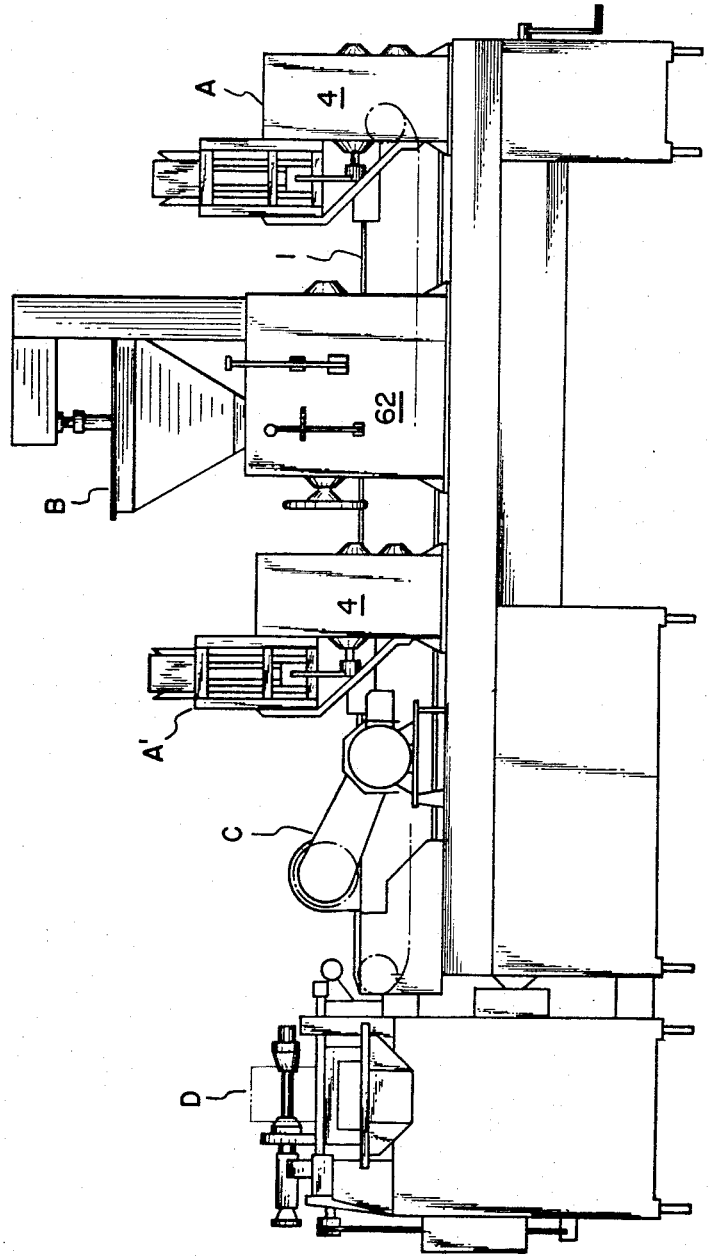
FIGURE 1 is a diagrammatic front view of an automatic sandwich-making machine according to the invention.
Figure 2:
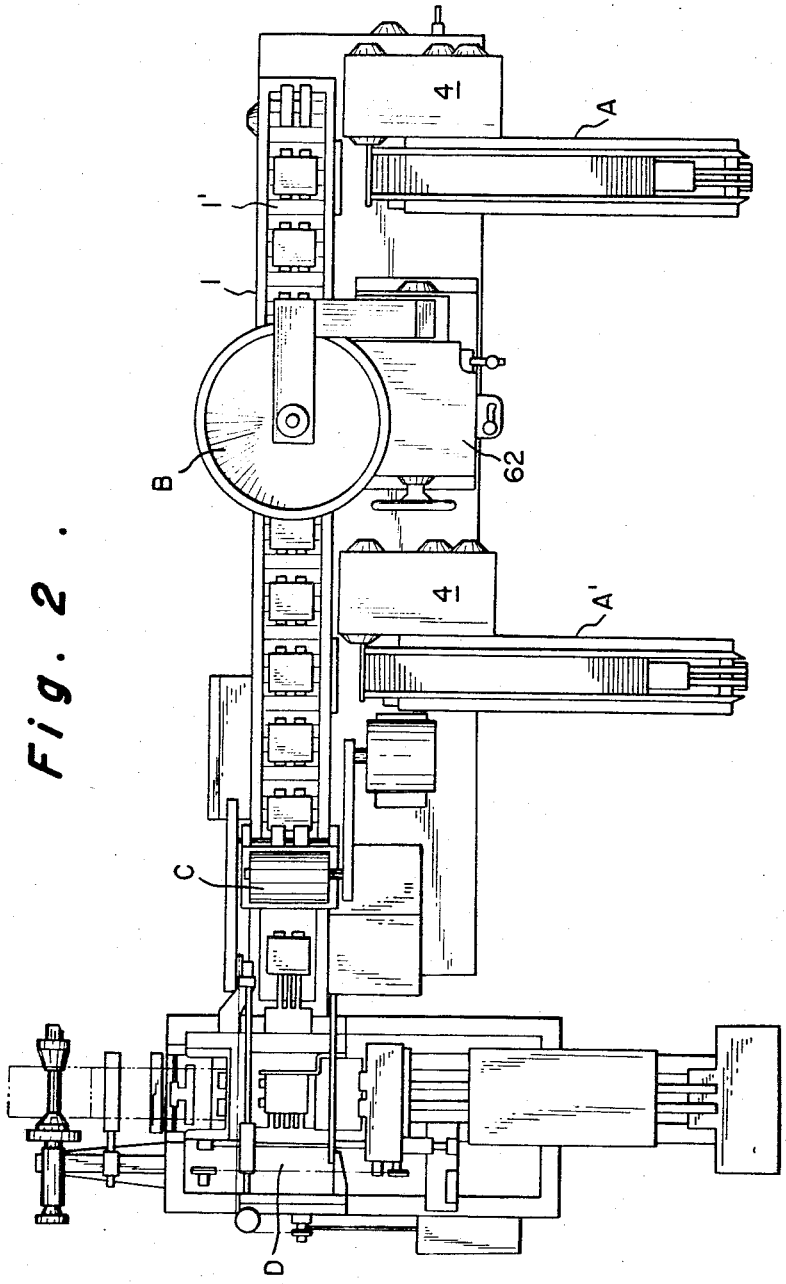
FIGURE 2 is a top view of the machine shown in FIG. 1.
Figure 3:
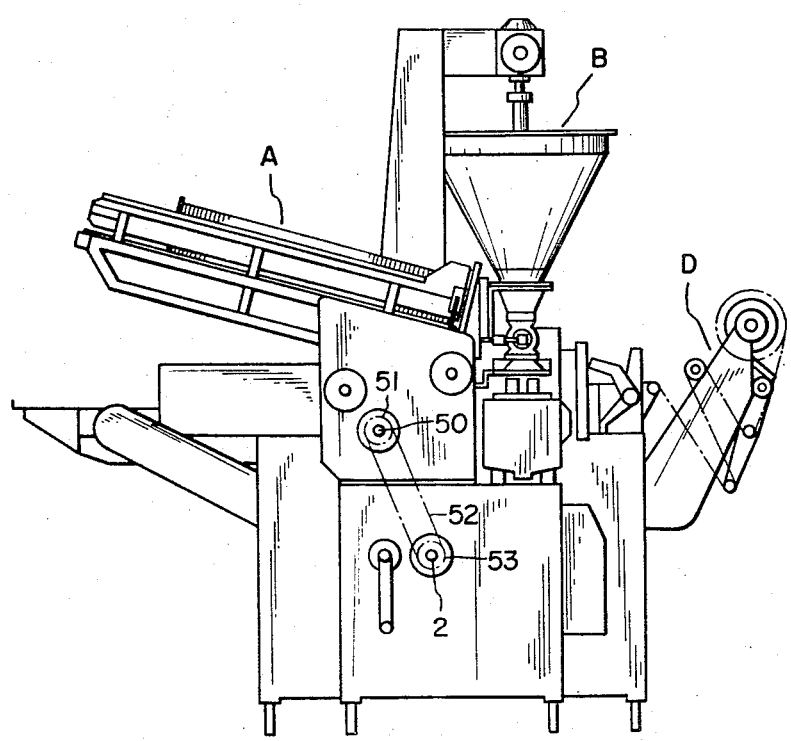
FIGURE 3 is a side view as seen from the right side of the machine.

As illustrated in FIGS. 1 and 2, a bread feeding unit as above described is disposed on either side of the intermediate material feeding unit to be described hereunder. The front bread feeding unit A feeds first or bottom slices of bread onto the conveyor 1', while the rear unit A' supplies second or top slices of bread.

Figure 16:
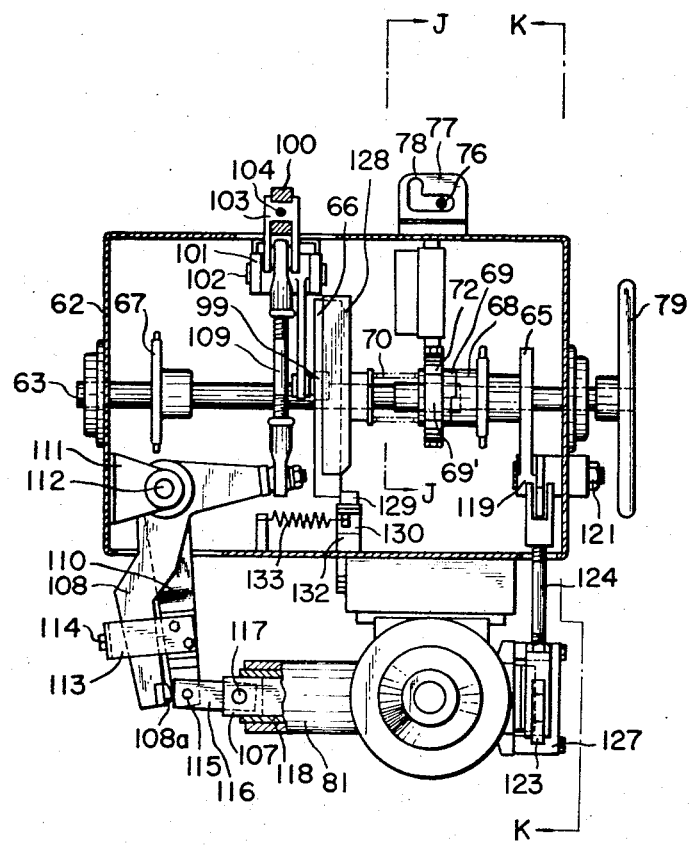
FIGURE 16 is a cross-sectional view taken along the line H—H in FIG. 12.

In a cam box 62 spaced apart suitable distances from the sides of said cam boxes 4, a shaft 63 is fitted in bearings 64. On the shaft 63 are mounted a cam 65 for controlling a link for an intake and a discharge port, a cam 66 for controlling a piston stroke, and a sprocket wheel 67 for driving an extrusion screw for the filling material. A sprocket wheel 68 on the follower side is rotatably fitted on the shaft 63. One end of the sprocket wheel 68 on the follower side is pawled, and fitted with a pawl clutch 69 having a key way and slidable in an axial direction. The pawl clutch 69 is urged by a compression spring 70 toward the sprocket wheel 68 on the follower side. A chain 61 is coupled between the rotary shaft 2 and the sprocket wheel 68 on the follower side. In the center of the pawl clutch 69 is provided a groove 69', in which a sliding piece 72 is inserted so that power transmission to the sprocket wheel 68 on the follower side can be shifted by means of a lever 73, shaft 74, bearing 75, and lever 76. A guide plate 77 is fixed to the cam box 62, and the lever 76 can be kept in a desired state in an L-shaped slit 78 of the guiding plate, depending on whether the clutch is engaged or disengaged (FIG. 16). When the clutch is disengaged, manual operation is made possible with a handle 79 fitted on one end of the shaft 63.

Figure 12:
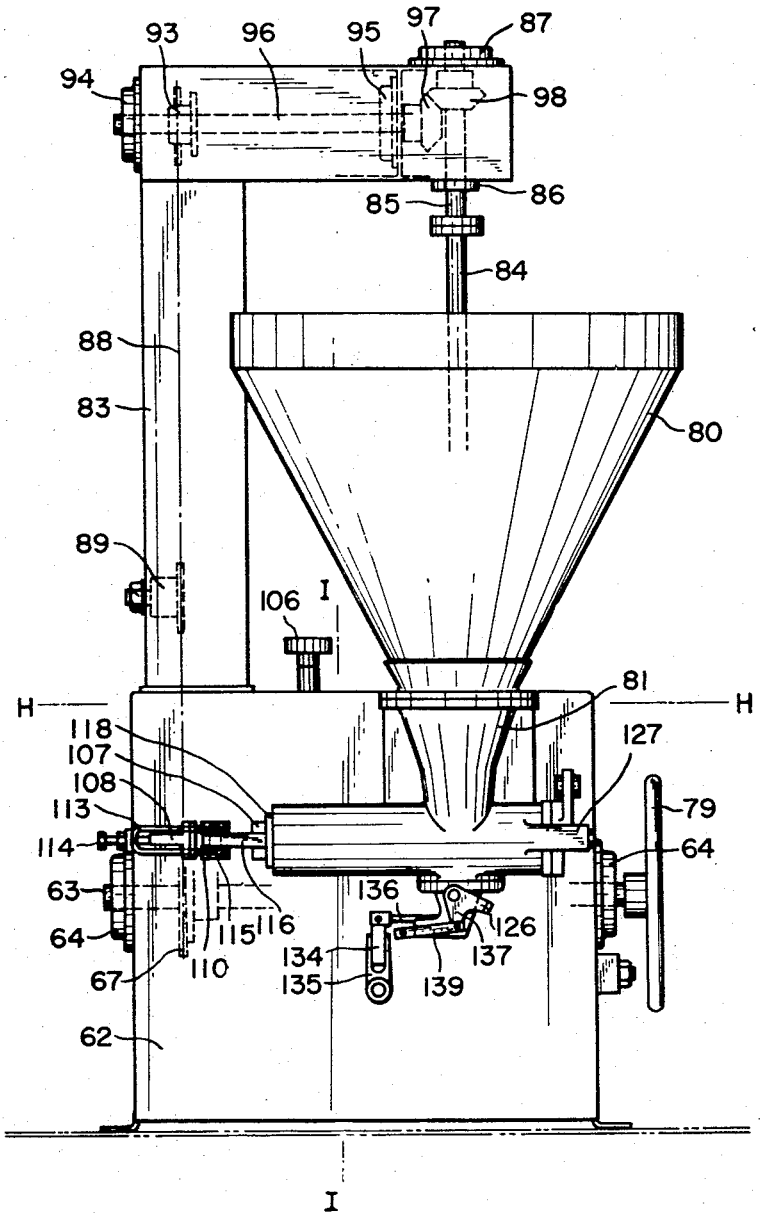
FIGURE 12 is a front view of an intermediate material feeding unit of the sandwich-making machine according to the invention.
Figure 13:
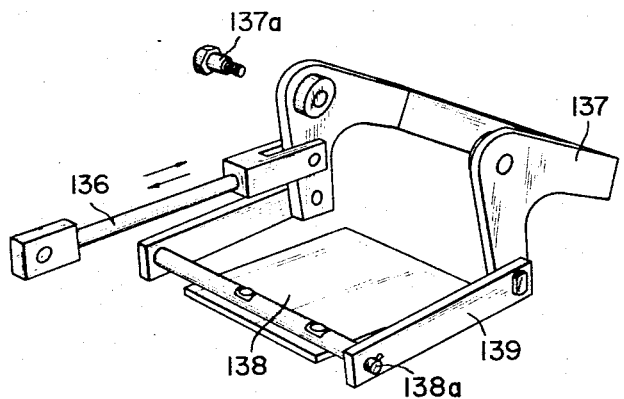
FIGURE 13 is a perspective view of portion G in FIG.15.
Figure 14:
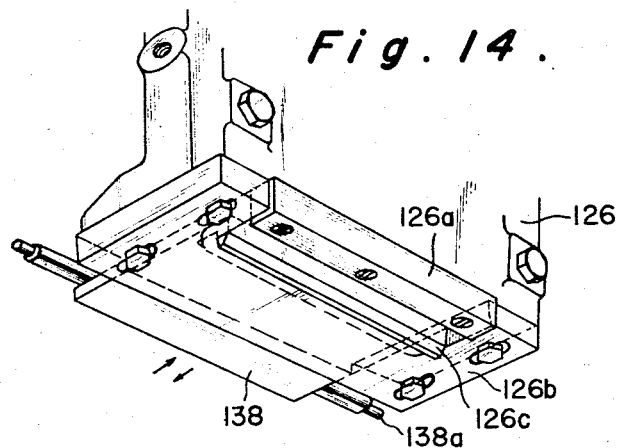
FIGURE 14 is a bottom view of portion G in FIG. 15.
Figure 15:
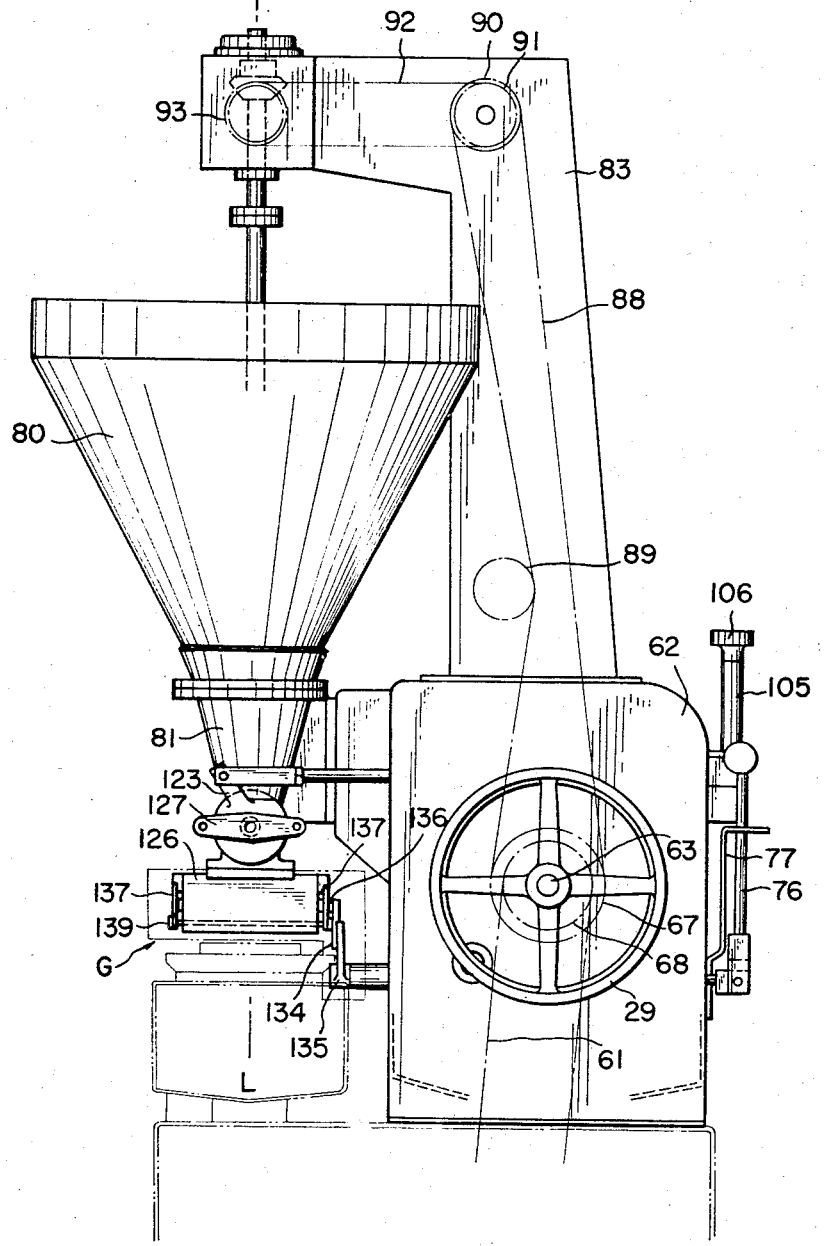
FIGURE 15 is a side view of the intermediate material feeding unit shown in FIG. 12.
Figure 20:
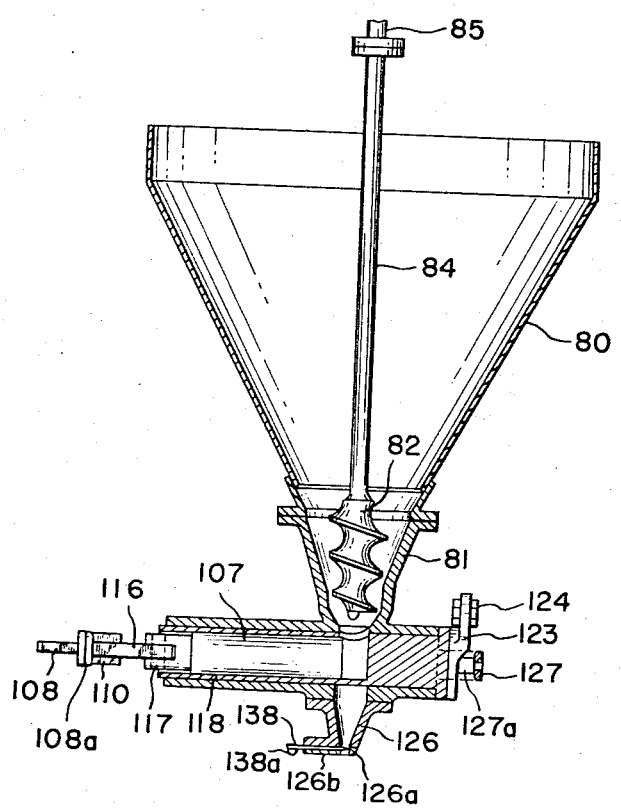
FIGURE 20 is a vertical sectional view taken along the line L—L in FIG. 15.

A tank 80 for accommodating the filling material is mounted on the upper portion of a main cylinder body 81 which is fixed to the cam box 62. An extrusion screw 82 for the filling material is shown in FIG. 20. The screw 82 is connected through shafts 84 and 85 to a housing 83 erected on the cam box 62 and equipped with power transmission means, as shown in FIGS. 12 and 15. The shaft 85 is mounted rotatably in the housing means of bearings 86 and 87. A sprocket wheel 90 on the follower side is driven by the driving sprocket 67 for the extrusion screw by a chain 88 and a pulley 89. Similarly, a sprocket wheel 93 is driven through a chain 92 by a driving sprocket wheel 91 which is integral with said sprocket wheel 90 on the follower side. The sprocket wheel 93 is fixedly secured to a shaft 96 which is supported by bearings 94 and 95. At one end of the shaft 96, a bevel gear 97 is fitted, which is in mesh with another bevel gear 98 for revolving the screw in such a manner that the revolution of the screw can force the filling material into the main cylinder body 81.

Figure 17:
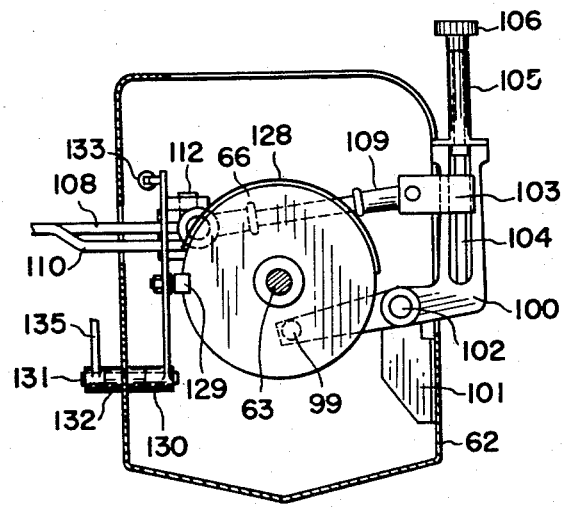
FIGURE 17 is vertical sectional view taken along the line I—I in FIG. 12.
Figure 18:
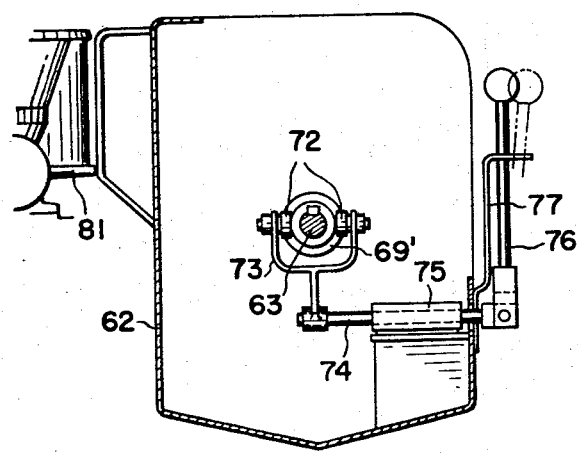
FIGURE 18 is a vertical sectional view taken along the line J—J in FIG. 16.

Next will be described the assembly for extruding the filling material. As illustrated in FIGS. 16, 17 and 20, the shaft 63 which is equipped with the driving cam 66 controls the operating stroke of a piston 107, as will be explained more fully hereinafter. A cam follower 99 which is driven by the driving cam 66 is rotatably supported by one end of a lever 100 which is pivoted on a bracket 101 (FIG. 17). On the other end of the lever 100, a vertical bore is provided, and a guide piece 103 is screwed onto a threaded rod 104 which is fitted in said bore. The threaded rod 104 is supported in a bearing 105 which is fitted on the top end of a vertical section of the lever 100, and a handle 106 is fitted to the uppermost end of the threaded rod 104.

By rotating the handle 106 in either direction, the guide plate 103 is moved upwards or downwards, so that the stroke of the piston 107 can be adjusted by way of a rod 109 pivotally supported by said guide plate 103 and a bell crank 108 connected to said rod 109, whereby the amount of extrusion of filling material or more particularly, the thickness of the filler material which is extruded can be controlled. The connection between said rod 109 and said bell crank 108 is effected by a universal joint. The bell crank 108 is rotatably fitted on a sleeve of a lever 110 which is pivotally supported by a bracket 111 with a pin 112, to provide an integral swingable unit.

Figures 21, 22:
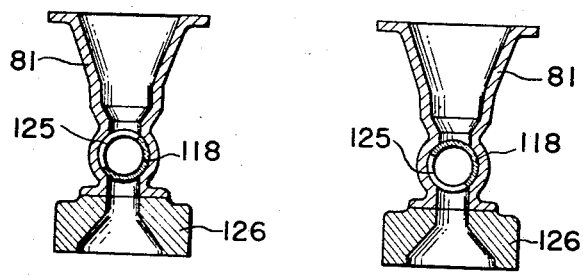
FIGURES 21 and 22 are vertical sectional views of the intermediate material feeding unit illustrating the operation for extruding intermediate material.

The free end of the lever 110 is pivotally supported by a piston rod 116 with a pin 115. Rod 116 is connected in turn to piston 107 by pin 117. The free end of the bell crank 108 is inserted in a bifurcate fitting 113 attached to the lever 110. By adjustment of the clearance between the lever 110 and bell crank 108 with a bolt 114 fitted on top of the bifurcate fitting, the stroke of piston 107 is limited and thus the timing for starting extrusion of filling material is regulated. Namely, as the width in the advancing direction of the bread slices is narrowed, the timing for starting the extrusion should be delayed. Secured to the free end of the bell crank 108 is an absorber 108a for shock and impact. Numeral 118 designates a rotary valve for opening or closing the intake and discharge port which is inserted in the piston 107. As indicated in FIGS. 21 and 22, the valve 118 is fitted rotatably in the main cylinder body 81 and is provided in the center with an intake and discharge port 125 which communicates with the bottom of the tank 80 accommodating the filling material.

Figure 19:
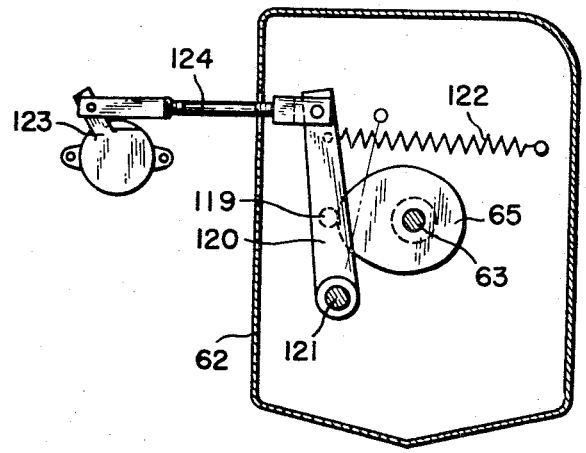
FIGURE 19 is a vertical sectional view taken along the line K—K in FIG. 16.

As shown in FIG. 20, the rotary valve 118 is integrally equipped with a lever 123 at the right-most end. The lever 123 is coupled by a lever 124 (FIG. 19) to a lever 120 which is pivotally supported at 121 to the cam box 62. On an intermediate portion of the lever 120, a cam follower 119 is fitted which operates slidably in contact with cam 65 which is fitted on the same shaft as the sprocket wheel 67 and the cam 66. A return spring 122 acts on the lever 120 to urge the cam follower 119 against cam 65. A stopper 127 of channel shape prevents rotary valve 118 from slipping out of cylinder body 81. Numeral 127a is a thrust member which is made of plastic material such as nylon. On the lower portion of the main cylinder body 81 is a body 126 defining a discharge port for the filling material, as shown in FIGS. 14, 20, 21 and 22. The body 126 with the discharge port is equipped with a cutter 138 which opens or closes the port. A tongue piece 126a, made of "Teflon," is provided on one side of the discharge port.

A tongue piece 126c is also made of "Teflon" and is provided on the end of a cover 126b which is slidably provided in the lower portion of said body 126.

The cutter 138 is operated by a driving means of the following construction. On the periphery of the cam 66, a cam member 128 is provided which protrudes sidewise from a surface of said cam. A lever 130 equipped with a cam follower 129 which is driven in contact with a side of the cam member 128 when said cam member revolves cooperatively with said cam 66, is fixedly secured to the inner end of a shaft 131 which is supported by bearings 132 in the cam box 62, as illustrated in FIGS. 16 and 17. A lever 135 is fitted on the outer end of said shaft 131, as shown in FIG. 17, and is coupled to said cutter 138 by way of a lever 134 which holds said lever 135 slidably thereon, a lever 136 coupled thereto, an arm 137 swingably pivoted on the lower portion of the main cylinder body 81 and a rod 139 coupled thereto. With such an arrangement, the rotary movement of said cam disc 128 is transmitted to the cutter 138 through the lever 130 equipped with the cam follower 129, shaft 131, levers 134, 135 and 136, arm 137 and rod 139, so that the cutter 138 can be slid to open the discharge port when the filling material is discharged and slid to close the port upon conclusion of each discharge. Sair cam member 128 may be replaced by a guide member projecting sidewise from a surface of said cam 66.

The feeding operations for the bread and the extrusion operation of the filling material will be described by reference specifically to FIG. 23.

Before the apparatus is started, slices of bread are placed in the bread compartments defined by the beds 5 and the side plates 8, 8', which guide the slices. The filling material such as jam, cheese, meat, egg, vegetable spread, or various pastes, is introduced into the tank 80. Then the lever 76 is set to the position in the shorter side of L-shaped slot 78 provided on the guide plate 77 (FIG. 16). This keeps the pawl clutch 72 away from the pawl of sprocket wheel 68 on the follower side, whereby the power from the main driving shaft 2 is cut off and the machine is ready for manual operation with the handle 79.

As the handle 79 is turned in a specified direction, the extrusion screw 82 for filling material is revolved and a sufficient pressure is produced for extruding the material downward continuously.

Figure 8:
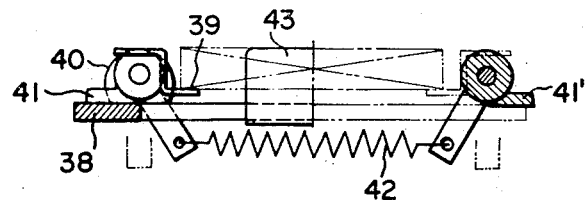
FIGURE 8 is a cross-sectional view taken along the line C—C of FIG. 7.

This completes the preparatory operation and the apparatus is switched over to automatic operation. Thereby, the main conveyor 1 is driven and bread feeding is commenced. First, the bread receiver 38 is moved toward the bread feeding unit, along a–b in FIG. 23 and is stopped between b and c, while the bread holder plates 29 and 29' on both sides of the receiver are opened along e–f on the line II of FIG. 23. Simultaneously with the opening of the holder plates 29 and 29', the bread slices 60 on the fixed beds 5 are slightly raised, due to ascending of the movable beds along e–f of the line II of FIG. 23, and are urged forward along i–i of the line III in FIG. 23. The foremost bread slice 60 is moved into and supported by the receiver 38. As soon as the foremost slice 60 reaches the receiving extensions 39 and 39', the movable beds begin to descend along g–h of the line II of FIG. 23 and recede along k–l of the line III. Then the bread holder plates 29 and 29' on both sides are closed along g–h of the line II of FIG. 23. In this way, the slices of bread are held in place by the fixed beds 5 and holder plates 29 and 29'. The foremost slices of bread which has been introduced into the receiver 38 is carried downwards as the receiver descends along c–d of the line 1 of FIG. 23 to a horizontal portion above the main conveyor 1'. As the receiver further descends, the levers 41 and 41' of receiving extensions 39 and 39' come in contact with the rod 53 for pushing up the extensions, and the latter are opened (FIG. 8) and the slice in the receiver 38 is deposited onto the main conveyor. The movement of the main conveyor 1' carries the slices to a subsequent zone where extrusion of the filling material is effected.

The above cycle is repeated intermittently, and the bread 60 is fed slice by slice by the receiver 38 onto the main conveyor 1'. While the bread 60 is fed, due to vertical and longitudinal movements of the beds, the bread is always under the pressure exerted by the pusher truck 55.

As described hereinabove, the bread slices 60 placed on the main conveyor 1' by the bread feeding unit, are carried in succession to the position below the filling material feeding unit B. Immediately before each slice of bread 60 arrives below the unit B, the piston 107 is moved along o–p of the line IV of FIG. 23. Since the intake and discharge port 125 of the rotary valve 118 is in communication with the tank 80 containing the filling material as shown in FIG. 21, the material is sucked into the main cylinder 81. On completion of this sucking action, levers 124 and 123 are moved along t–q of the line V of FIG. 23, and valve 118 is rotated through at an angle of 90°, so that the discharge port 121 communicates with the discharge port of body 126, as shown in FIG. 22. Upon alignment of the discharge port 125 with that in body 126, the piston 107 proceeds along m–n of the line VI of FIG. 23 and starts discharging of the filling material, pushing the latter through the port in body 126. At this time the front edge of a slice in the advancing direction is located immediately below the discharge port in body 126. With the advance of the slice, the filling material is extruded through the discharge port in body 126 in the form of a thin strip and is applied and spread over the upper face of the slice of bread from the front to the rear edge thereof.

Meanwhile, simultaneous with starting of the discharging stroke of piston 107 (at the point m of the line IV of FIG. 23), the cutter 138 recedes to open the discharge port (u–v of the line VI of FIG. 23), and on completion of the discharging by the piston, the cutter 138 closes the discharge port in body 126, thereby to stop the extrusion of the filling material.

By the repetition of the above operation, the filling material is applied and spread over each of the slices of bread 60 being carried in succession on the main conveyor 1'. The slices are then conveyed to the bread feeding unit A' where the upper slices of bread are supplied. In the bread feeding unit A', the slices of bread are fed by the same procedure as above described for bread feeding unit A and the slices from unit A' are placed on the filling material on the bottom slices of bread, to thereby form sandwiches.

The sandwiches thus formed are further carried by the main conveyor 1' to a trimming and cutting unit C, where the sandwiches are trimmed and cut to predetermined width, after which they are wrapped in the wrapping unit D before they are delivered from the apparatus.

In the embodiment of the invention above described, the bread feeding units A and A' and the filling material feeding unit B are all operably connected to the main shaft 2 coupled to the driving source installed inside the main frame and are controlled in their operations by the several cams described above which operate relative to the movement of the bread slices. However, it is not always necessary to operably couple all the units to the main shaft 2, and the units may be modified to have individual driving motors for respective operations timed with the movements of the bread slices, without departing from the spirit of the invention.

Also, the invention has been described with respect to a machine for making sandwiches which is composed of two layers of bread and an intermediate layer of filling material, but it is possible to make sandwiches comprising one, three or four layers of bread, either by omitting unit A' or arranging additional numbers of bread feeding units and intermediate filling layer feeding units in a suitable manner.

While the invention has been herein described and illustrated in the accompanying drawings in connection with a preferred embodiment, it will be understood that the invention is not limited to such embodiment, but covers all modifications, alterations, and equivalents which may be included in the spirit and scope of the invention as defined in the appended claims.

What is claimed is:

1. Apparatus for making sandwiches comprising conveyor means having an advancing path of travel in a longitudinal direction, bread feeding means located on a side of the path of travel of the conveyor means for intermittently feeding slices of bread onto the conveyor means and material feeding means located downstream of said bread feeding means and operated in synchronized manner with the bread feeding means for applying a layer of material onto the slices of bread as they successively pass the feeding means, said material feeding means comprising a container for said material having a discharge opening, extruding means comprising cylinder means provided with a suction inlet into which material from the container is sucked and with an exhaust outlet from which the material is discharged, said cylinder means being disposed below said container, piston means mounted in said cylinder means for alternately sucking material into the cylinder means and discharging the material therefrom, means for operating said piston means while permitting adjusting of the stroke thereof in relation to the transfer of the bread, drive means for the latter means, means defining a discharge port in alternate communication with said exhaust outlet, cutter means disposed at the discharge port for sliding perpendicularly to the direction of discharge of the material to open and close said discharge port, and means for operating said cutter means in relation with the bread feeding means and the piston means, the latter means including a member having one end connected to said cutter means and an opposite end coupled to the drive means for the means which operates the piston means.

2. Apparatus as claimed in claim 1, comprising second bread feeding means located downstream of the material feeding means and operating in synchronization therewith and with the first said bread feeding means for applying slices of bread onto the advancing bread slices with the layers of material thereon as they pass said second feeding means whereby closed sandwiches are formed.

3. Apparatus as claimed in claim 2, wherein each said bread feeding means comprises a pair of spaced guide plates for the edgewise engagement of a stack of bread slices, bread delivery means pivotably inserted adjacent said guide plates for receiving bread slices one by one from said guide plates and for depositing the same onto the conveyor means and means for intermittently actuating the bread delivery means.

4. Apparatus as claimed in claim 1, wherein said bread feeding means comprises means for supporting a stack of bread slices along an inclined path, means for successively advancing the stack slice by slice, and bread delivery means for receiving the slices of bread one by one from the last said means and depositing the same onto the conveyor means.

5. Apparatus as claimed in claim 4, wherein said means for supporting a stack of bread slices comprises a bed plate having an inclination with the horizontal, a pair of guide plates for edgewise engaging the bread slices in sliding relation, said bread delivery means being disposed at the lower of the ends of the bed plate for receiving the foremost slice of bread of the stack and means supporting the bread delivery means for pivotal movement from the position where it receives the foremost slices of bread to a horizontal position above the conveyor means.

6. Apparatus as claimed in claim 1, wherein said material feeding means further comprises control means coupled to said piston means for varying the stroke thereof and thereby the quantity of material drawn into and discharged from said cylinder means.

7. Apparatus as claimed in claim 1, wherein said cylinder means comprises a rotatable cylinder and the feeding means further comprises means for alternately rotating the cylinder to provide alternating communication thereof with the discharge opening of the container in conjunction with the reciprocating movement of the piston such that as the piston is withdrawn from said cylinder the inlet is in communication with the opening of the container and material is sucked into the cylinder whereas upon penetration of the piston into the cylinder the opening of the container is closed and material is discharged from the outlet of said cylinder via said port.

References Cited
UNITED STATES PATENTS

| | | | |
|---|---|---|---|
| 2,603,341 | 7/1952 | Knee | 107—1 |
| 2,626,575 | 1/1953 | Whitsel | 107—1 |
| 2,747,521 | 5/1956 | Gardner | 107—1 |
| 2,923,257 | 2/1960 | Monaco | 107—1 |
| 3,183,856 | 5/1965 | Jolly | 107—1 |

OTHER REFERENCES

Robert Cook Makes Sandwiches on Mass Basis, Popular Mechanics, pp. 81, February 1945.

WILLIAM I. PRICE, *Primary Examiner.*